(12) United States Patent
Kimura

(10) Patent No.: US 6,785,914 B2
(45) Date of Patent: Sep. 7, 2004

(54) TOILET BOWL WASHER FLUID RESERVOIR DRAIN VALVE SPACER BODY

(75) Inventor: Hiroaki Kimura, Tokyo (JP)

(73) Assignee: Plenty Co., Ltd., Tokyo (JP)

( * ) Notice: Subject to any disclaimer, the term of this patent is extended or adjusted under 35 U.S.C. 154(b) by 0 days.

(21) Appl. No.: 10/331,600

(22) Filed: Dec. 31, 2002

(65) Prior Publication Data

US 2003/0131404 A1 Jul. 17, 2003

(30) Foreign Application Priority Data

Jan. 16, 2002 (JP) ........................................ 2002-007462
Nov. 13, 2002 (JP) ........................................ 2002-329366

(51) Int. Cl.⁷ ................................................ E03D 1/34
(52) U.S. Cl. .......................................................... 4/378
(58) Field of Search ............................................. 4/378

(56) References Cited

U.S. PATENT DOCUMENTS 3,939,507 A * 2/1976 Clark ............................ 4/327
4,471,499 A * 9/1984 Troman et al. ................ 4/393
4,922,556 A * 5/1990 Roosa ............................ 4/378

FOREIGN PATENT DOCUMENTS

JP 2825348 9/1998
WO 95/10670 4/1995

* cited by examiner

Primary Examiner—Charles E. Phillips
(74) Attorney, Agent, or Firm—Wenderoth, Lind & Ponack, L.L.P.

(57) ABSTRACT

A toilet bowl washer fluid reservoir drain valve spacer body is capable of mounting flapper action valves. The toilet bowl washer fluid reservoir drain valve spacer body includes a main body section which has a cone shape and is capable of being seated on a upper edge section of a drain valve seat in a fluid-tight manner. An opening section is provided at an underside of the main body section, and an upper edge section of cone-shaped main body section is capable of detachably fluidly sealing against an annular seal ring of the flapper action valve. Also provided is a holding section for holding an overflow pipe and supporting the flapper action valve in such a way as to be able to pivot the flapper action valve in a vertical direction, wherein the holding section protrudes from the main body section.

9 Claims, 7 Drawing Sheets

TOILET BOWL WASHER FLUID RESERVOIR DRAIN VALVE SPACER BODY

BACKGROUND OF THE INVENTION

1. Field of the Invention

The present invention relates to a toilet bowl washer fluid reservoir drain valve spacer body used for a toilet bowl washer fluid reservoir drain valve composed of a drain valve seat and a flapper action valve.

2. Description of the Related Art

Conventionally, there is a toilet bowl washer fluid reservoir which is provided with a drain valve therein and which can supply washer fluid into a flush toilet bowl of a siphon jet system.

Figure 9A:
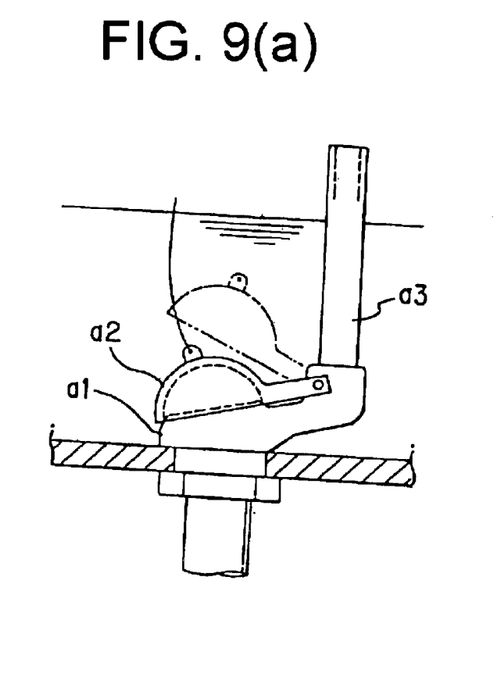
FIG. 9(a) is a side view illustrating a first conventional drain valve (A-type).

At present, concerning the drain valve described above, roughly classified as illustrated in FIGS. 9(a) and 9(b), there are two kinds of drain valves. Firstly, as exemplary illustrated in FIG. 9(a), there is one type (hereinafter referred to as "A type") which is composed of a drain valve seat "a1" from which overflow pipe "a3" is extended and whose upper edge portion is formed with a required oblique angle, and a drain valve body "a2" having an approximately spoon shape which is supported by a shaft in such a way that the drain valve body "a2" is capable of swinging in a vertical direction in the vicinity of a lower area of the overflow pipe, and which is seated on the drain valve seat so as to cover the drain valve seat.

Figure 9B:
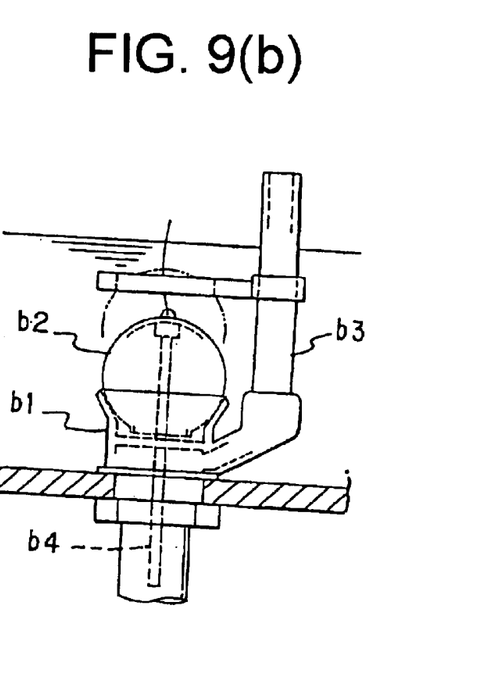
FIG. 9(b) is a side view illustrating a second conventional drain valve (B-type).

Secondly, as exemplary illustrated in FIG. 9(b), there is another type (hereinafter referred to as "B type") which is composed of a drain valve seat "b1" in which an overflow pipe "b3" is extended from an outer side surface of the drain valve seat "b1", which drain valve seat "b1" has a cone shape such that an inner side surface enlarges in an upper direction and which has openings at a middle portion thereof shaped as a radial pattern in a direction of a diameter, a drain valve body "b2" having a shape of a hollow ball which is seated on an inclined inner surface of the drain valve seat in such a way as to tightly engage the inclined inner surface of the drain valve seat and which has an opening at an underside thereof, and a guide pole "b4" which hangs from an internal upper portion of the drain valve body and which is inserted into a hole provided at a center of the opening of the drain valve seat and which is capable of moving in a vertical direction within the hole, wherein the drain valve seat "b1" and the drain valve body "b2" are connected by the guide pole "b4".

In any of the drain valves, the drain valve body is connected to a lever handle provided at a side surface of the reservoir by a line shaped member, wherein when the lever handle is manipulated so as to turn, washer fluid is drained in such a way that the drain valve body is separated from the drain valve seat, and then washer fluid stored in the reservoir is capable of being drained so as to store air in the drain valve in order to maintain an open condition of the valve if the valve is opened once (required ascending force is obtained).

As to an amount of fluid drained from a conventional toilet bowl washer fluid reservoir, which is determined based on a design concept of actual manufacture, the amount of drained fluid is set so that the amount of drained fluid becomes a somewhat larger quantity in order not to generate a condition in which a little filth cannot be removed because the amount of drained fluid is little, and often, the amount of drained fluid is excessive.

Thereupon, an official gazette of U.S. Pat. No. 2,825,348, entitled "Amount of Stream Adjustment Free Flapper Action Valve for Toilet Reservoir", pays attention to a problem in that an excessive amount of drained fluid is made to correct for an inadequate amount of drained fluid and which brings about a settlement.

Figure 10:
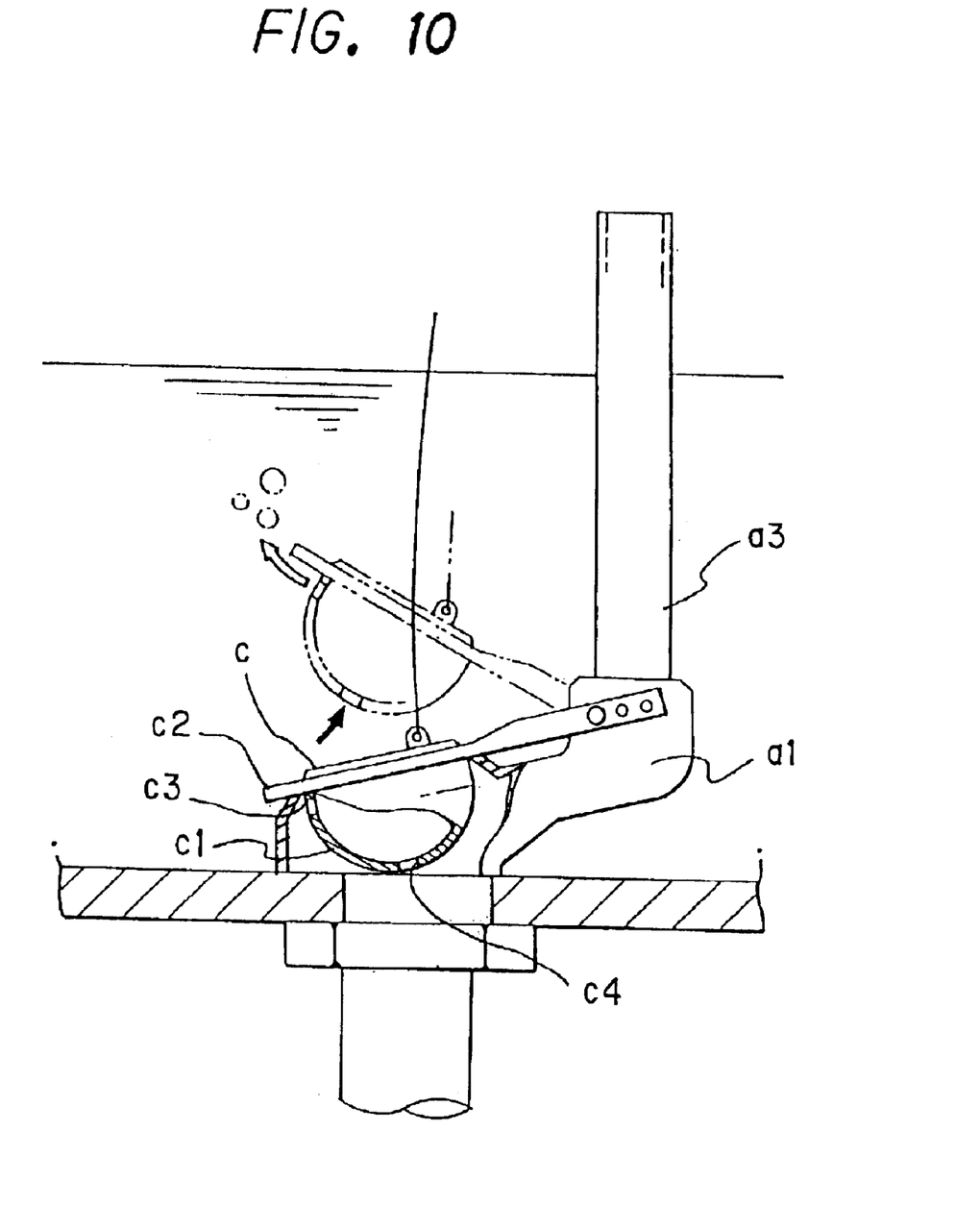
FIG. 10 is a longitudinal sectional view illustrating a case in which a flapper action valve is mounted on an A-type drain valve seat.

Flapper action valve "c" disclosed in official gazette of U.S. Pat. No. 2,825,348, as illustrated in FIG. 10, is provided with a spherical cup "c1" which is capable of being inserted into a drain valve seat. Annular seal ring "c2" of the spherical cup, which is capable of tightly engaging, and being disengaged from, an upper edge portion of the drain valve seat, is provided at an upper peripheral surface of the spherical cup "c1". In addition, hole "c3" is provided in a side wall of the spherical cup "c1", and discharges air from an interior of the spherical cup "c1", and hole "c4" is provided in a bottom of the spherical cup "c1" so that an amount of fluid is passed through the hole "c4". These holes "c3" and "c4" are ones that connect a side surface of the spherical cup in the vicinity of a bottom surface of the annular seal ring "c2" of the spherical cup and an underside of the spherical cup. The flapper action valve "c" is supported by a shaft in such a way as to be able to pivot in a vertical direction in the vicinity of a bottom of the overflow pipe "a3". In addition, the flapper action valve "c" is connected to a lever handle (not illustrated) provided at a side surface of the reservoir by a line shaped member so that the valve is capable of being opened and closed.

The flapper action valve "c" having such a configuration starts to drain washer fluid stored in the reservoir when the flapper action valve "c" is separated from the drain valve seat upon manipulation to rotate the lever handle. And then, air within an internal portion of the spherical cup "c1" is discharged gradually from the hole "c3" provided in a side wall of the spherical cup "c1" in the vicinity of the bottom surface of the annular seal ring "c2", and simultaneously, part of the washer fluid within the reservoir gradually flows into the internal portion of spherical cup "c1" via the hole "c4" provided in the bottom of the spherical cup. During the time washer fluid flows into the internal portion of the spherical cup, the flapper action valve "c" maintains an open condition of the valve.

In the course of time, the internal portion of the spherical cup "c1" of the flapper action valve "c" becomes filled with washer fluid and loses its buoyant force gradually, and is seated on drain valve seat "a1" by its own weight. And then, water stored within the internal portion of the spherical cup "c1" is discharged from the hole "c4" provided in the bottom of the spherical cup "c1", and then, the flapper action valve "c" returns to an initial state.

The flapper action valve "c" is a very appropriate one which is capable of simply obtaining a water-saving effect by replacing an existing drain valve body with the flapper action valve "c". At present, the flapper action valve "c" is on sale at general merchandising stores such as home improvement centers and has a good reputation.

However, this flapper action valve is one which only can cope with a drain valve of the A-type described above, namely the flapper action valve can cope with a case in which the drain valve of the A-type is used. The flapper action valve "c" does not conform to the drain valve of the B-type, which is currently distributed largely in the market.

SUMMARY OF THE INVENTION

Thereupon, an object of the present invention is to provide a toilet bowl washer fluid reservoir drain valve spacer body which is capable of mounting a flapper action valve in a manner so as to achieve improvement in terms of a water saving effect with regard to an existing toilet bowl washer fluid reservoir approximately in its entirety.

In order to achieve the above mentioned object, according to a first aspect of the present invention, there is provided a toilet bowl washer fluid reservoir drain valve spacer body which comprises a main body section having a cone shape and capable of being seated on an inner side surface and/or upper edge section of a drain valve seat in a fluid-tight manner. The main body section has opening sections provided at an underside thereof, and an upper edge section of the cone-shaped main body section is capable of detachably fluidly sealing against an annular seal ring of a flapper action valve. The valve spacer body also comprises a holding section for holding an overflow pipe and supporting the flapper action valve in such a way as to be able to pivot the flapper action valve in a vertical direction, wherein the holding section protrudes from the main body section.

According to a second aspect of the present invention, there is provided a toilet bowl washer fluid reservoir drain valve spacer body which comprises a main body section having a cone shape and capable of being seated on inner side surface and/or upper edge section of a drain valve seat in a fluid-tight manner. The main body section has opening sections provided at an underside thereof, and an upper edge section of the cone-shaped main body section is capable of detachably fluidly sealing against an annular seal ring of a flapper action valve. The valve spacer body also comprises a holding section for holding an overflow pipe and supporting the flapper action valve in such a way as to be able to pivot the flapper action valve in a vertical direction, wherein the holding section protrudes from the main body section. The holding section is arranged between the drain valve seat, which is provided with the overflow pipe at side surface thereof and protrudes from an internal section of an underside of the toilet bowl washer fluid reservoir, and the flapper action valve which is provided with the annular seal ring formed at an upper portion of a peripheral surface of a hollow cone-shaped section. The flapper action valve is capable of detachably fluidly sealing against an upper edge section of the main body section, which is capable of being inserted into the drain valve seat. Also provided is an interconnecting hole between a side surface of the hollow cone-shaped section in the vicinity of an underside of the annular seal ring and an underside of the hollow cone-shaped section. The flapper action valve is capable of being supported in such a way as to be able to pivot in the vertical direction with respect to the overflow pipe or in the vicinity of the overflow pipe.

According to a third aspect of the present invention, there is provided a toilet bowl washer fluid reservoir drain valve spacer body, in accordance with the first aspect, wherein the opening sections have radial shapes and a mounting hole is provided at a central portion of a constituent plane where the opening sections are provided. Also, there is provided a fixing member for fixing the main body section to the drain valve seat by being passed through both of a drain valve body guide hole, provided in the drain valve seat, and the mounting hole.

According to a fourth aspect of the present invention, there is provided a toilet bowl washer fluid reservoir drain valve spacer body, in accordance with the first aspect, wherein the main body section is connected to the holding section via an adjusting mechanism which is capable of adjusting an angle of the main body section in a vertical direction with respect to the holding section, which is capable of adjusting an interval between the main body section and the holding section, or which is capable of adjusting a height between the main body section and the drain valve seat.

According to a fifth aspect of the present invention, there is provided a toilet bowl washer fluid reservoir drain valve spacer body, in accordance with the first aspect, wherein the flapper action valve is connected to a lever handle, provided at a toilet bowl washer fluid reservoir, via a line shaped member, and a float is provided at a mid portion of the line shaped member.

According to a sixth aspect of the present invention, there is provided a toilet bowl washer fluid reservoir drain valve spacer body which comprises a main body section having a cone shape and capable of being seated on an inner side surface and/or upper edge section of a drain valve seat in a fluid-tight manner. The main body section has opening sections provided at an underside thereof, and an upper edge section of the cone-shaped main body section is capable of detachably fluidly sealing against an annular seal ring of a flapper action valve. The valve spacer body also comprises a supporting section for supporting the flapper action valve in such a way as to be able to pivot the flapper action valve in a vertical direction, wherein the supporting section protrudes from the main body section. The holding section is arranged between the drain valve seat, which is provided with the overflow pipe at a side surface thereof and protrudes from an internal section of an underside of the toilet bowl washer fluid reservoir, and the flapper action valve which is provided with the annular seal ring formed at an upper portion of a peripheral surface of a hollow cone-shaped section. The flapper action valve is capable of detachably fluidly sealing against an upper edge section of the main body section, which is capable of being inserted into the drain valve seat. Two parallel arms protrude from the annular seal ring toward an outer direction. In these arms a plurality of general-purpose holes, which correspond to each other, are provided. Also provided is an interconnecting hole between a side surface of the hollow cone-shaped section in the vicinity of an underside of the annular seal ring and an underside of the hollow cone-shaped section. The flapper action valve is capable of being supported in such a way as to be able to pivot in a vertical direction with inner side holes corresponding to each other as required holes for support.

According to a seventh aspect of the present invention, there is provided a toilet bowl washer fluid reservoir drain valve spacer body, in accordance with the sixth aspect, wherein the opening sections have radial shapes and a mounting hole is provided at a central portion of a plane where the opening sections are provided. Also, there is provided a fixing member for fixing the main body section to the drain valve seat via both of a drain valve body guide hole, provided in the drain valve seat, and the mounting hole.

According to an eighth aspect of the present invention, there is provided a toilet bowl washer fluid reservoir drain valve spacer body, in accordance with the sixth aspect, wherein the main body section is connected to the holding section via an adjusting mechanism which is capable of adjusting an angle of the main body section in a vertical direction with respect to the holding section, which is capable of adjusting interval between the main body section and the holding section, or which is capable of adjusting a height between the main body section and the drain valve seat.

According to a ninth aspect of the present invention, there is provided a toilet bowl washer fluid reservoir drain valve spacer body, in accordance with the sixth aspect, wherein there are provided a plurality of general-purpose holes, which correspond each other, in two parallel arms protruded from the annular seal ring of the flapper action valve. The flapper action valve is supported by a supporting section of the main body section in such a way that the flapper action valve can pivot with respect to the main body section with arbitrary inner holes, of the general-purpose holes, as desired holes for support. There is also provided a weight that is held in outer holes, of the general-purpose holes, as holding holes, so that the weight causes a pivoting load of a pivoting operation to be reduced with the supporting section of the main body section functioning as a fulcrum.

According to a tenth aspect of the present invention, there is provided a toilet bowl washer fluid reservoir drain valve spacer body in accordance with the sixth aspect, wherein the flapper action valve is connected to a lever handle provided at a toilet bowl washer fluid reservoir via a line shaped member, and a float is provided at a mid portion of the line shaped member.

BRIEF DESCRIPTION OF THE DRAWINGS

Various features of novelty which characterize the invention are pointed out with particularly in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Next, embodiments of the invention will be described with reference to the drawings below. In the drawings, symbol 1 is a toilet bowl washer fluid reservoir drain valve spacer body, symbol 2 is a drain valve seat, and symbol "c" is a flapper action valve.

(First Embodiment)

Figure 1:
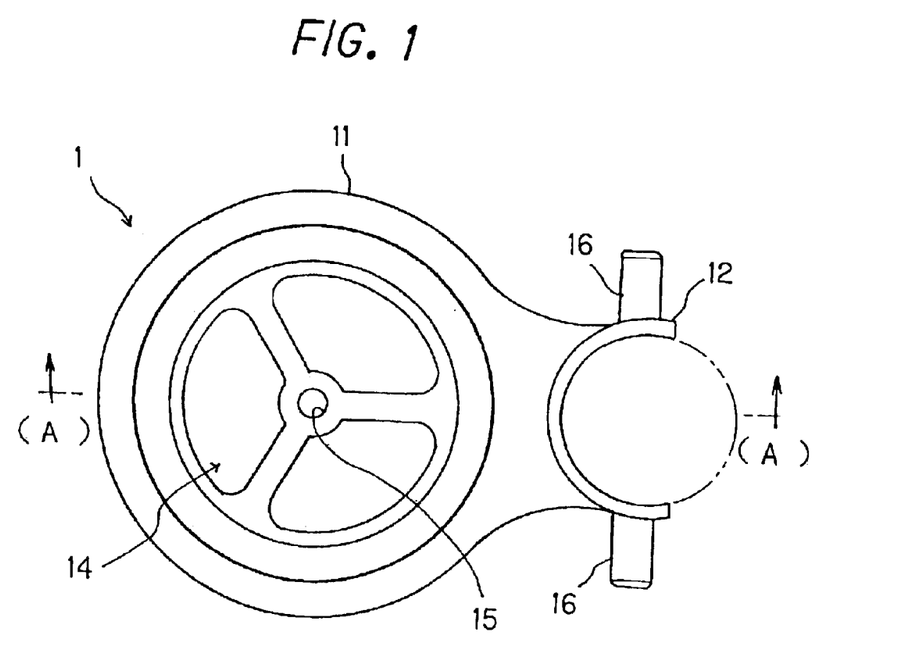
FIG. 1 is a top plan view illustrating a toilet bowl washer fluid reservoir drain valve spacer body according to a first embodiment of the present invention.
Figure 2:
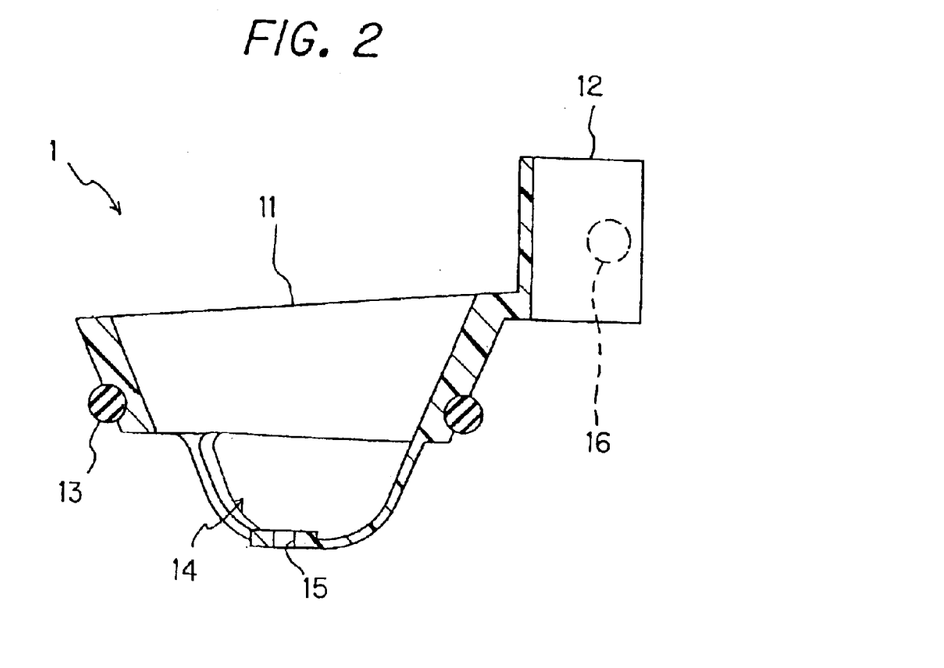
FIG. 2 is a longitudinal sectional view along line (A)—(A) of FIG. 1.

As illustrated in FIGS. 1 and 2, the toilet bowl washer fluid reservoir drain valve spacer body 1 according to a first embodiment of the present invention comprises: a main body section 11 having an external appearance of an approximately cone shape, which is provided with O-ring 13, that is seated on upper edge portion 2a of the drain valve seat 2, at a mid portion thereof; opening section 14, having a radial shape for streaming washer fluid, beneath the O-ring 13; and a holding section 12 having an approximately C shape for holding an overflow pipe "f", wherein the main body section 11 and the holding section 12 are formed by integrally molding synthetic resin.

The holding section 12 has a required diameter which is somewhat smaller than a diameter of the overflow pipe "f", and is capable of being elastically deformed. In addition, there is provided a mounting hole 15, for fixing the spacer body 1 depending on types of existing drain valve seats, at a central portion of a constituent surface which forms the opening section 14, and a supporting shaft 16 for supporting the flapper action valve "c" in such a way as to be able to pivot the flapper action valve "c" in a vertical direction that is at right angles relative to an opening direction of the C-shaped holding section 12, is provided at the holding section 12.

It should be noted that this toilet bowl washer fluid reservoir drain valve spacer body 1 is most preferably formed by injection molding synthetic resin however, its material and manufacturing method are not specifically restricted.

Next, there will be a description of the flapper action valve "c". The flapper action valve is a float valve used for a toilet reservoir, which is a commercially available one, for example a flapper action valve made by Unique Product, Inc. Two parallel arms extend from an annular seal ring provided on the flapper action valve. A plurality of general-purpose holes which correspond to each other are provided in the arms. The flapper action valve "c" is supported by supporting shaft 16 of the holding section 12 of the main body section in such a way as to be able to pivot in a vertical direction that is perpendicular to the opening direction of the holding section 12.

(Second Embodiment)

Figure 3:
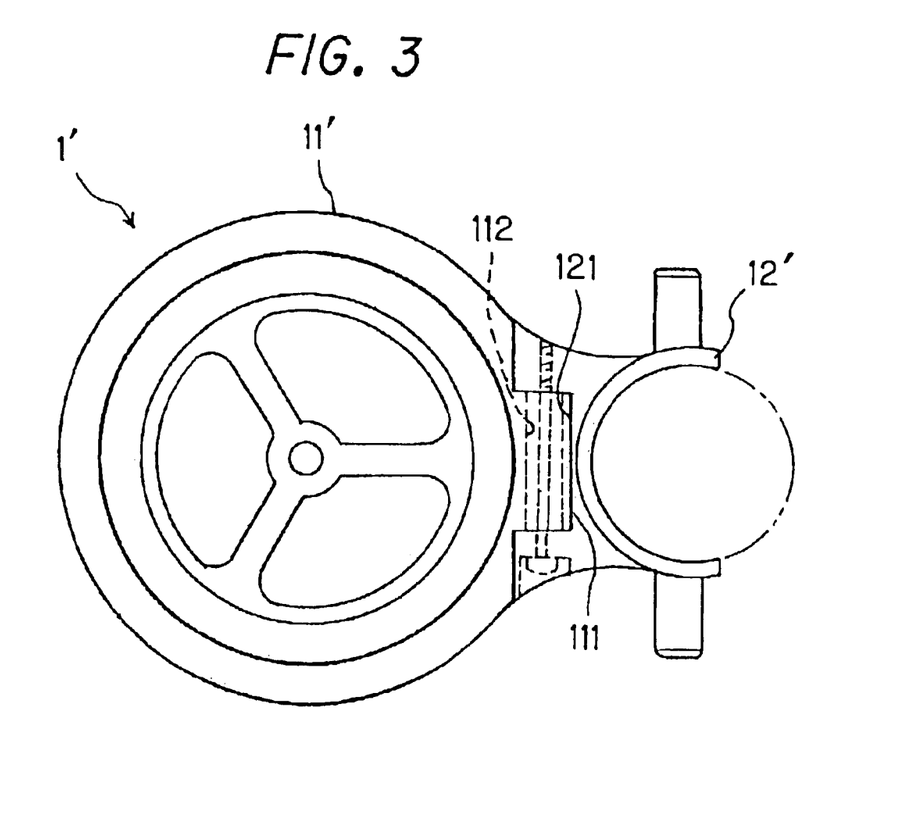
FIG. 3 is a plan view illustrating a toilet bowl washer fluid reservoir drain valve spacer body according to a second embodiment of the present invention.

FIG. 3 illustrates a second embodiment. As exemplary illustrated in FIG. 3, the second embodiment of the present invention is provided with a projection section 111 at a side of main body section 11', and a concave section 121 at holding section 12' which is engaged with the projection section 111. The holding section 12' is separated from the main body section 11'. The holding section 12' and the main body section 11' are joined by screws after being adjusted to a desired angle in a vertical direction. Accordingly, when an upper surface section of drain valve seat 2 is out of a horizontal position, namely, when the upper surface section of the drain valve seat 2 has a desired angle of inclination, it becomes possible to mount spacer body 1' to the drain valve seat easily by performing the above described angle adjustment.

Figure 4:
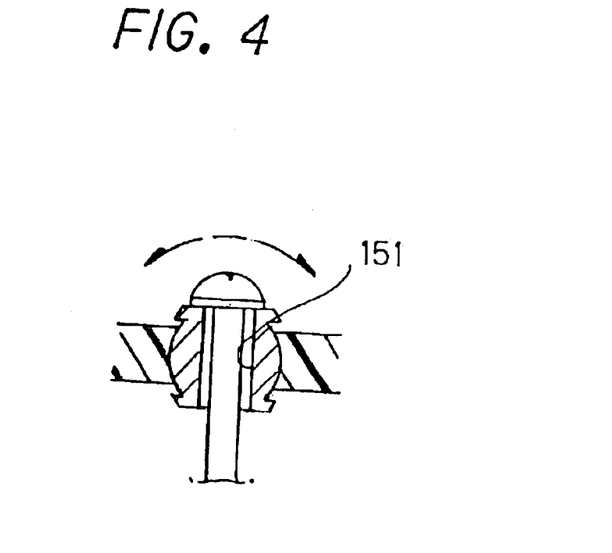
FIG. 4 is an enlarged vertical longitudinal sectional view illustrating a periphery of a mounting hole section in a case in which a mounting hole is constituted by a ball joint method.

It should be noted that when the spacer body is mounted on drain valve seat 2 of the B-type drain valve, a plane of mounting hole 15 that serves as an interconnection with a drain valve body guide hole 21 is angled, and therefore, as exemplary illustrated in FIG. 4, a mounting hole 151 is formed in a separate member of ball joint that is capable of rotating.

In addition, a hole section 112 for inserting a bolt into the projection section 111 at the side of the main body section, as exemplary illustrated in FIG. 3, is preferably oval such that adjusted can be an interval between the main body section 11' and the holding section 12', whereby it becomes possible to cope with various kinds of toilet bowl washer fluid reservoirs in which a slant distance between drain valve seat 2 and overflow pipe "f" differs. Accordingly, a high integrity system can be provided.

Further, when a height of the main body section 11' is different from a height of the drain valve seat 2, it becomes possible to mount the spacer body 1' on the drain valve seat upon adjusting a height distance between the main body section 11' and the holding section 12'.

It should be noted that an adjusting device of the present embodiment is comprised of this angle adjusting mechanism, interval adjusting mechanism and height distance adjusting mechanism.

Figure 5:
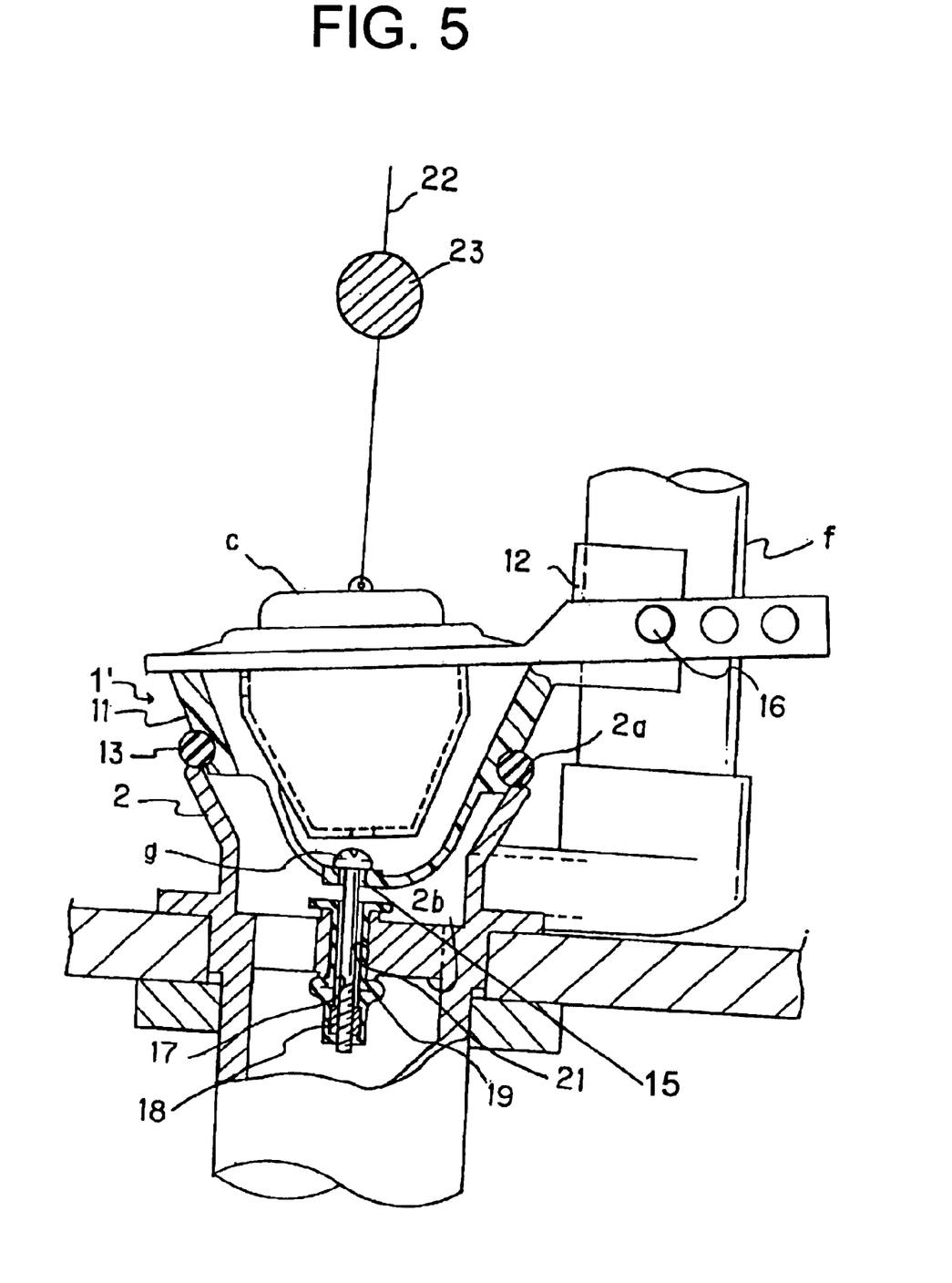
FIG. 5 is a longitudinal sectional view illustrating a case in which the spacer body is mounted on a B-type drain valve seat.

The toilet bowl washer fluid reservoir drain valve spacer body 1, 1' constituted as described in the first embodiment and the second embodiment is mounted on the drain valve seat 2 in such a way as following described with reference to FIG. 5.

First, flange shaped rubber bushing 19 (fixing member), having a communicating hole 17 and a nut 18 inserted within the communicating hole 17 at a lower end section thereof, is inserted into drain valve body guide hole 21 which is provided at a mid portion of an internal section of the drain valve seat.

Subsequently, the holding section 12 is set to the overflow pipe "f". When the holding section 12 is pressed to the overflow pipe "f", ends of the holding section 12 are spread along a periphery of the overflow pipe "f", and then the holding section 12 is further pressed to the overflow pipe "f" so that the holding section 12 holds the overflow pipe "f".

And then, the main body section 11 is made to seat on the drain valve seat 2 while sliding the holding section 12 along the overflow pipe "f" until O-ring 13 is somewhat pressed to the upper edge portion 2a of the drain valve seat 2. At this time, if a water-resisting bonding adhesive is applied to an internal surface in the vicinity of a lower portion of the upper edge portion 2a beforehand, it is possible to appropriately prevent water-leakage between the main body section 11 and the drain valve seat 2, and furthermore, the main body section 11 is strongly fixed to the drain valve seat 2.

Furthermore, upon inserting bolt "g" through the mounting hole 15 and screwing the bolt "g" to the nut 18 the rubber bushing 19, positioned at lower section 2b of the opening section provided at a mid portion of an internal portion of the drain valve seat with a radial shape in a direction of pipe diameter, is deformed in such a way that a diameter of the rubber bushing 19 is enlarged, so that the rubber bushing suppresses positional deviation of the spacer body 1 in an upper direction, and simultaneously, the spacer body 1 is strongly fixed to the drain valve seat 2.

Lastly, the flapper action valve "c" is made to engage the supporting shaft 16 so as to be able to pivot in a vertical direction, so that a mounting operation is terminated.

The flapper action valve "c" is connected to a lever handle (not illustrated) provided at the toilet bowl washer fluid reservoir via line shaped member 22, and hollow float 23 is provided at a mid portion of the line shaped member 22. The float 23 facilitates rotation of the lever handle while utilizing its buoyant force, and prevents the flapper action valve from closing too soon as a result of water pressure and/or water flow at a time of draining.

It should be noted that when distance between the drain valve seat 2 and the overflow pipe "f" differs from a distance dimension (distance between a center of the holding section and a center of the main body section) of the spacer body 1, this can be accounted for by adjusting a distance between the main body section 11' and the holding section 12' via the oval hole 112.

In addition, if the spacer body 1', of the aspect in which angle of the spacer body is adjustable in an upper or lower direction for a desired angle, is used while using the drain valve body the of A-type drain valve without change, it is possible to establish water level to an arbitrary position in which change takes place from an open valve state to a closed valve state, which is determined by angle of gradient of the drain valve seat upper edge portion 2a and the drain valve body, so that it is possible to obtain a water saving effect without using the flapper action valve "c".

Figure 6:
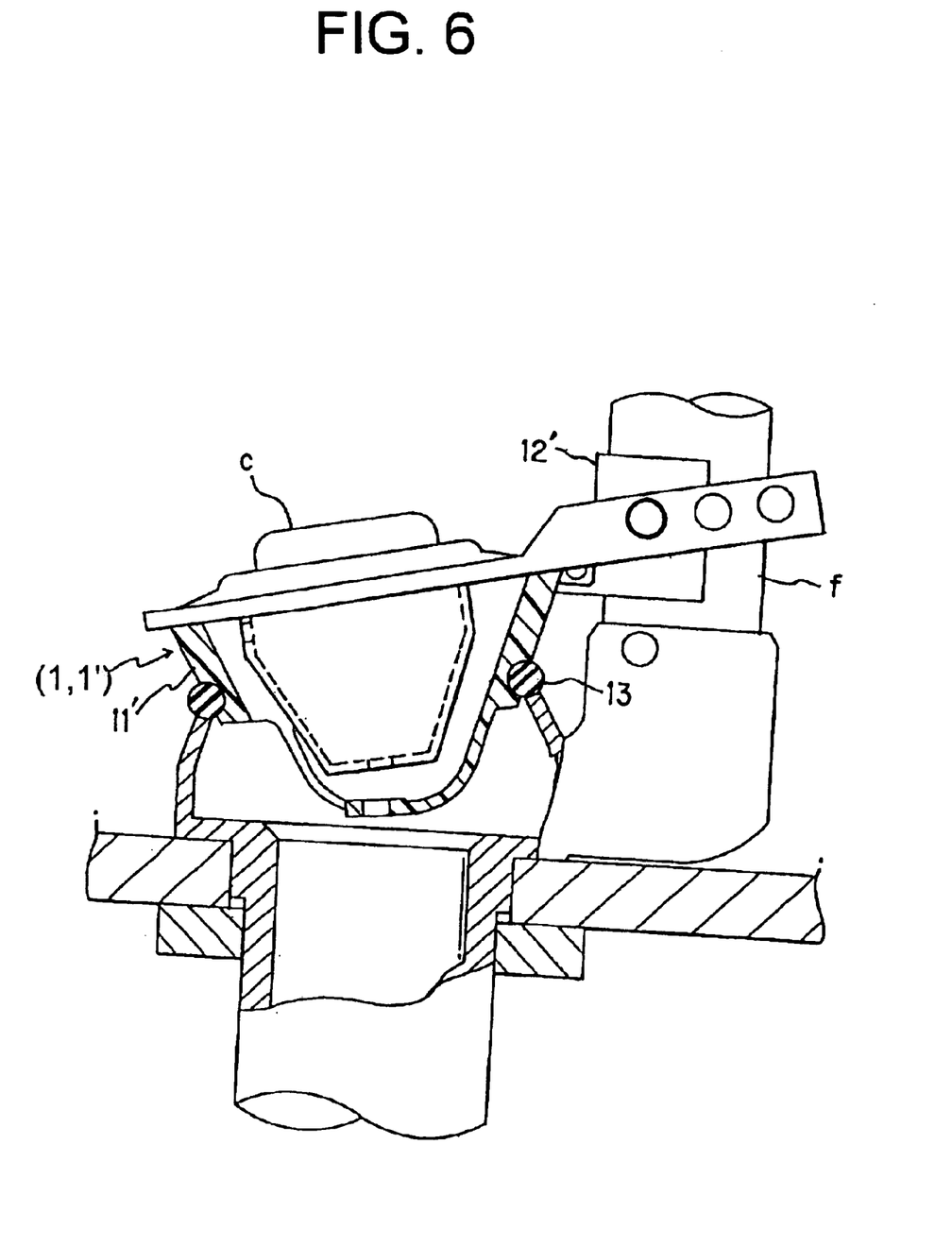
FIG. 6 is a longitudinal sectional view illustrating a case in which the spacer body is mounted on an A-type drain valve seat.

Further, as exemplary illustrated in FIG. 6, the spacer bodies 1, 1' are capable of being mounted even though the drain valve body of the A-type drain valve is replaced with the flapper action valve "c".

(Third Embodiment)

Figure 7:
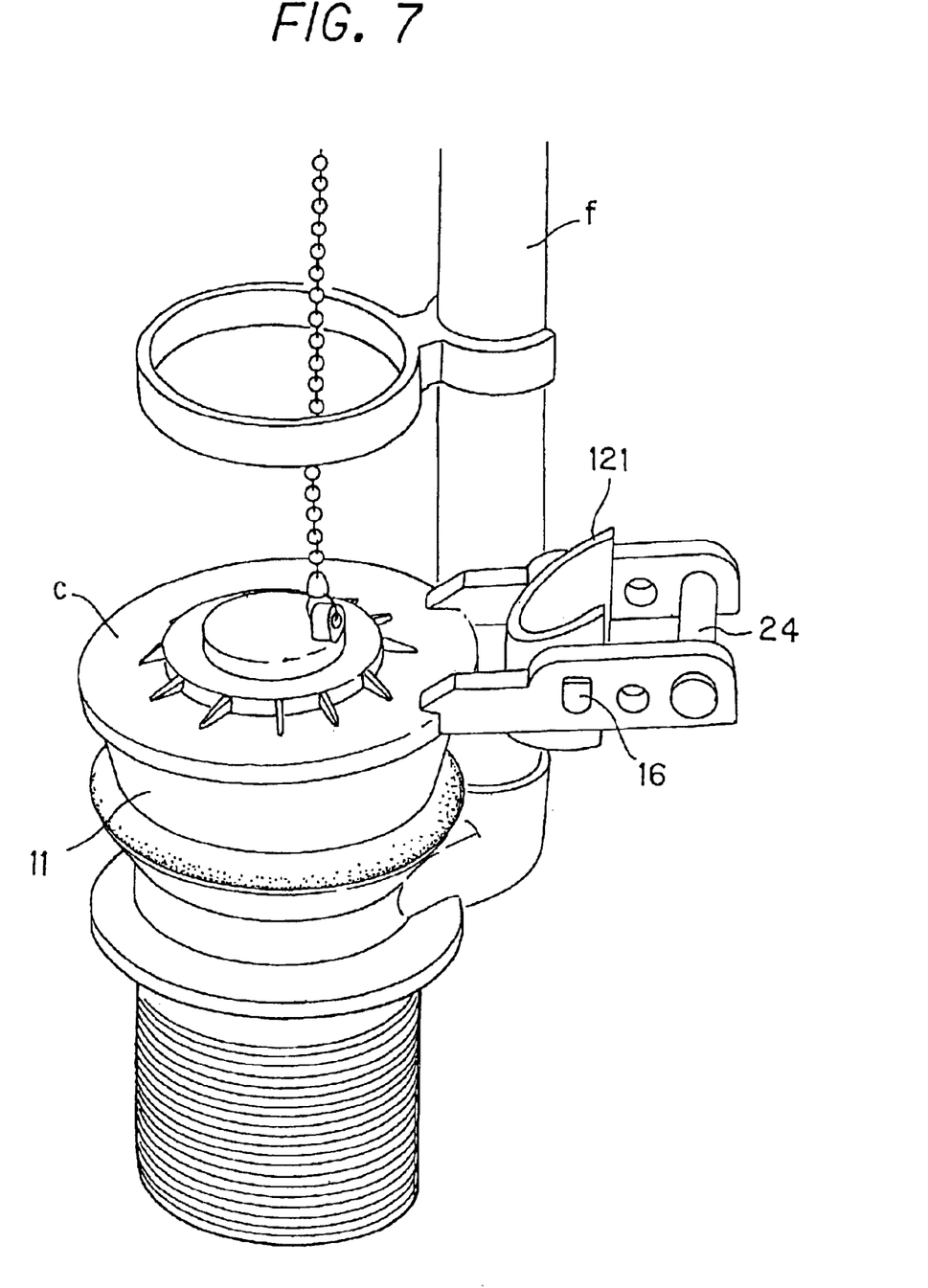
FIG. 7 is a perspective view illustrating a condition in which a toilet bowl washer fluid reservoir drain valve spacer body according to a third embodiment of the present invention, and a flapper action valve supported by a spacer body using a shaft, are fixed to a drain valve seat.

A third embodiment of the present invention will be described referring to the drawings. In the present embodiment, flapper action valve "c" is combined with main body section 11 in such a way that the flapper action valve "c" can pivot in a vertical direction with respect to the main body section 11. The main body section 11 and the flapper action valve "c" are arranged on drain valve seat 2 in such a way that a protruded section formed by the main body section 11 and the flapper action valve "c" is made to protrude in an arbitrarily determined direction so that the protruded section does not interfere with an overflow pipe and/or a neighborhood of the overflow pipe. FIG. 7 is an explanational view illustrating a relationship between the flapper action valve "c" and the main body section 11. A plurality of general-purpose holes, which correspond each other, are provided in arms of the flapper action valve "c". Two arbitrary holes which correspond to each other in the vicinity of a flapper action valve main body, from among the general-purpose holes, are taken as desired holes for supporting the main body section 11, and these holes are engaged with supporting shaft 16 of supporting section 121 of the main body section 11. The flapper action valve "C" is supported by the supporting shaft 16 of the supporting section 121 in such a way as to be able to pivot in a vertical direction that is perpendicular to an opening direction as illustrated in FIG. 7.

Figure 8:
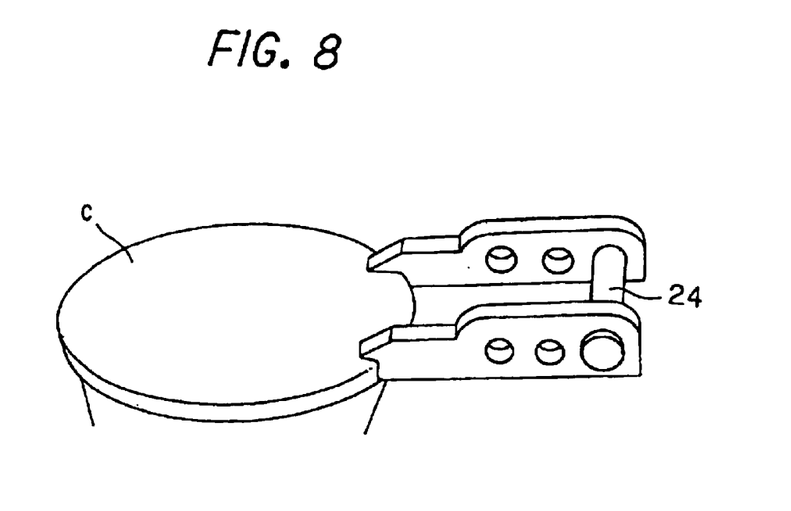
FIG. 8 is a perspective view illustrating a state in which a weight according to the third embodiment of the present invention is mounted on the flapper action valve.

FIG. 8 is an explanational view illustrating a relationship between the flapper action valve "c" and a weight 24. The weight 24 is mounted in holes provided at an outermost section of the arms, from among the general-purpose holes provided in the arms of the flapper action valve "c". It is preferable that the weight is metal in order to secure a desired weight per minimum volume; however, quality of material is not restricted if specific gravity is not less than 1, and the material is insoluble in water. Shape of the weight 24 is not restricted except for a portion that is mounted to the flapper action valve "c". The weight 24 is mounted in holes provided at the outermost section of the arms of the flapper action valve "c"; however, an arbitrary mounting method is fine, for instance, respective grooves can be provided in the vicinity of both end sections of the weight 24, and the weight 24 is mounted directly into the holes at the outermost section of the arms of the flapper action valve "c". It is also preferable that the weight 24 is mounted into the holes by using mounting member such as an E-ring, O-ring and the like. Further, there is provided a stopper section at one end section of the weight 24 and a groove in the vicinity of the other end section of the weight 24. The weight 24 is inserted into the holes and is mounted by the mounting member, such as the E-ring, O-ring and the like.

The toilet bowl washer fluid reservoir drain valve spacer body 1 constituted as described in the third embodiment is mounted on the drain valve seat 2 of the B-type drain valve by performing the following procedure.

First, flange shaped rubber bushing 19 (fixing member), having a communicating hole 17 and a nut 18 inserted within the communicating hole 17 at lower end section thereof, is inserted into drain valve body guide hole 21 which is provided at a mid portion of an internal section of the drain valve seat.

And then, the main body section 11 is made to seat on the drain valve scat 2 until O-ring 13 is somewhat pressed to the upper edge portion 2a of the drain valve seat 2. At this time, if a water-resisting bonding adhesive is applied to an internal surface in the vicinity of a lower portion of the upper edge portion 2a beforehand, it is possible to appropriately prevent water-leakage between the main body section 11 and the drain valve seat 2, and furthermore, the main body section 11 is strongly fixed to the drain valve seat 2. The supporting section 121 protruded in an outer direction from the main body section 11 is capable of adopting an arbitrary direction, and thus, the supporting section 121 is not engaged with the overflow pipe "f". Accordingly, even though there is an obstruction in the vicinity of the overflow pipe, state of affairs in which the main body section 11 cannot be mounted on the drain valve seat 2 does not take place. An engaged section between the main body section 11 and the flapper action valve "c" does not interfere with an obstruction in the vicinity of the overflow pipe. Accordingly, in every case, the main body section 11 can be mounted on the drain valve seat 2.

The flapper action valve "c" is connected to a lever handle (not illustrated) provided at the toilet bowl washer fluid reservoir via line shaped member 22, and hollow float 23 is provided at a mid portion of the line shaped member 22. Further, the weight 24 is provided at the arms of the flapper action valve "c". The float 23 and the weight 24 facilitate rotation of the lever handle, and prevents the flapper action valve from closing too soon as a result of water pressure and/or water flow at a time of draining.

As described above, according to the present invention, a main body section of the toilet bowl washer fluid reservoir drain valve spacer body is provided with a holding section which is engaged with an overflow pipe and supports a flapper action valve in such a way that the flapper action valve is capable of pivoting in a vertical direction, whereby even though a drain valve is of the B-type, with no supporting section used, it is possible to use the flapper action valve which brings about a water saving effect.

Further, according to the present invention, since the main body section of the toilet bowl washer fluid reservoir drain valve spacer body is capable of being fixed to a drain valve seat via both of a mounting hole and a drain valve body guide hole which is provided beforehand, it is possible to strongly fix the toilet bowl washer fluid reservoir drain valve spacer body to the drain valve seat without preparing mounting structure for separately fixing the toilet bowl washer fluid reservoir drain valve spacer body to the drain valve seat.

Furthermore, according to the present invention, when an upper surface section of the drain valve seat is non-horizontal, namely, the upper surface section of the drain valve seat has a desired angle of inclination, it becomes possible to mount the spacer body on the drain valve seat easily. And, when a slant distance between the drain valve seat and the overflow pipe differs, interval adjustment between the main body section and the holding section is performed so that the toilet bowl washer fluid reservoir drain valve spacer body is capable of being mounted on the drain valve seat easily. Thus, it becomes possible to cope with various kinds of toilet bowl washer fluid reservoirs, and accordingly, it is possible to provide a very appropriate toilet bowl washer fluid reservoir drain valve spacer body.

Furthermore, according to the present invention, a flapper action valve is connected to a lever handle provided at a toilet bowl washer fluid reservoir via a line shaped member, and a hollow float is provided at a mid portion of the line shaped member. Accordingly, there is an effect that the float facilitates rotation of the lever handle while utilizing its buoyant force, and prevents the flapper action valve from closing too soon as a result of water pressure and/or water flow at a time of draining.

Furthermore, according to the present invention, the flapper action valve is supported in such a way that the flapper action valve can pivot in the vertical direction with the supporting section provided at the main body section functioning as a fulcrum. A supporting shaft of the supporting section of the main body section is engaged with holes of the arms of the flapper action valve, and then this engaged section is protruded outwardly. However, since it is possible to control its protruded direction arbitrarily, interference between the engaged section and the overflow pipe and/or neighborhood of the overflow pipe is capable of being avoided. Consequently, although there are obstructions in the vicinity of the overflow pipe, the main body section 11 and the flapper action valve "c", which is supported by the main body section 11, cannot fail to be mounted to the drain valve seat 2.

Furthermore, according to the present invention, since the main body section of the toilet bowl washer fluid reservoir drain valve spacer body is capable of being fixed to the drain valve seat via both of the mounting hole and the drain valve body guide hole which is provided beforehand, it is possible to strongly fix the toilet bowl washer fluid reservoir drain valve spacer body to the drain valve seat with the engaged section protruded outwardly in an arbitrary direction without preparing mounting structure for separately fixing the toilet bowl washer fluid reservoir drain valve spacer body to the drain valve seat.

Furthermore, according to the present invention, when an upper surface section of the drain valve seat is non-horizontal, namely, the upper surface section of the drain valve seat has a desired angle of inclination, it becomes possible to mount the spacer body on the drain valve seat easily with the engaged section protruded outwardly in an arbitrary direction. And, when a slant distance between the drain valve seat and the overflow pipe differs, interval adjustment between the main body section and the holding section is performed so that the toilet bowl washer fluid reservoir drain valve spacer body is capable of being mounted on the drain valve seat easily with the engaged section protruded outwardly in arbitrary direction. When a height of the main body section is different from a height of the drain valve seat, it becomes possible to mount the spacer body on the drain valve seat upon adjusting a height between the main body section and the holding section with the engaged section protruded outwardly in an arbitrary direction.

Furthermore, according to the present invention, arbitrary inner holes of plurality of holes provided in parallel arms extended outwardly from an annular seal ring of the flapper action valve are taken to be desired holes for support, and these inner holes are engaged with a supporting section of the main body section in such a way that the flapper action valve can pivot with respect to the main body section, while there is provided a weight at outer holes of the arms in order to reduce a pivoting load of a pivoting operation with the supporting section of the flapper action valve functioning as a fulcrum. Accordingly, there is an effect that weight of the arms of the flapper action valve facilitates rotation of a lever handle, and prevents the flapper action valve from closing too soon as a result of water pressure and/or water flow at a time of draining.

Furthermore, according to the present invention, the flapper action valve supported by the supporting section of the main body section is seated on the drain valve seat with the engaged section between the arms of the flapper action valve and the main body section protruded outwardly in an arbitrary direction, the flapper action valve is connected to a lever handle provided at a toilet bowl washer fluid reservoir via a line shaped member, and a hollow float is provided at a mid portion of the line shaped member. Accordingly, there is an effect that operation of the float and a weight facilitates rotation of the lever handle, and prevents the flapper action valve from closing too soon as a result of water pressure and/or water flow at a time of draining.

What is claimed is:

1. A toilet bowl washer fluid reservoir drain valve spacer body comprising:
   a cone-shaped main body section constructed and arranged to be seated on an inner side surface and/or an upper edge section of a drain valve seat in a fluid-tight manner, said cone-shaped main body section including
      (i) a lower portion having openings therein, and also having a central mounting opening, and
      (ii) an upper portion constructed and arranged to detachably receive a seal ring of a flapper action valve in a fluid-tight manner;
   a support section for supporting the flapper action valve in a pivotable manner such that the flapper action valve is pivotable toward and away from said upper portion, said support section extending from said cone-shaped main body section; and
   a member for fixing said cone-shaped main body section to the drain valve seat by passing said member through said central mounting opening and a guide hole provided in the drain valve seat.

2. The toilet bowl washer fluid reservoir drain valve spacer body according to claim 1, wherein
   said support section includes projections that are to engage first respective openings in respective arms that extend from the flapper action valve so as to support the flapper action valve in the pivotable manner.

3. The toilet bowl washer fluid reservoir drain valve spacer body according to claim 2, wherein
   said support section comprises a holding section for engaging an overflow pipe.

4. The toilet bowl washer fluid reservoir drain valve spacer body according to claim 3, wherein
   said cone-shaped main body section is connected to said holding section via an adjustment mechanism that is
      (i) constructed and arranged to adjust an angle of said cone-shaped main body section relative to said holding section, and to adjust an interval between said cone-shaped main body section and said holding section, or
      (ii) constructed and arranged to adjust a distance between said cone-shaped main body section and the drain valve seat.

5. The toilet bowl washer fluid reservoir drain valve spacer body according to claim 4, wherein
   the flapper action valve is connected to a lever handle, provided at a toilet bowl washer fluid reservoir, via a rod-shaped member, and
   a float is provided at a mid-portion of the rod-shaped member.

6. The toilet bowl washer fluid reservoir drain valve spacer body according to claim 1, wherein
   said support section comprises a holding section for engaging an overflow pipe.

7. A toilet bowl washer fluid reservoir drain valve spacer body comprising:
   a cone-shaped main body section constructed and arranged to be seated on an inner side surface and/or an upper edge section of a drain valve seat in a fluid-tight manner, said cone-shaped main body section including
      (i) a lower portion having openings therein, and
      (ii) an upper portion constructed and arranged to detachably receive a seal ring of a flapper action valve in a fluid-tight manner; and
   a support section for supporting the flapper action valve in a pivotable manner such that the flapper action valve is pivotable toward and away from said upper portion, said support section extending from said cone-shaped main body section,
   wherein said cone-shaped main body section is connected to said support section via an adjustment mechanism that is
      (i) constructed and arranged to adjust an angle of said cone-shaped main body section relative to said support section, and to adjust an interval between said cone-shaped main body section and said support section, or
      (ii) constructed and arranged to adjust a distance between said cone-shaped main body section and the drain valve seat.

8. The toilet bowl washer fluid reservoir drain valve spacer body according to claim 7, wherein
   said holding section includes projections that are to engage respective openings in respective arms that extend from the flapper action valve so as to support the flapper action valve in the pivotable manner.

9. The toilet bowl washer fluid reservoir drain valve spacer body according to claim 7, wherein
   said support section comprises a holding section for engaging an overflow pipe.

* * * * *